US010115972B2

(12) United States Patent
Rinzler et al.

(10) Patent No.: US 10,115,972 B2
(45) Date of Patent: Oct. 30, 2018

(54) SINGLE WALL CARBON NANOTUBE BASED AIR CATHODES

(75) Inventors: Andrew Gabriel Rinzler, Newberry, FL (US); Rajib Kumar Das, Gainesville, FL (US); John R. Reynolds, Dunwoody, GA (US); Ryan M. Walczak, Blacksburg, VA (US)

(73) Assignee: University of Florida Research Foundation, Incorporated, Gainesville, FL (US)

( * ) Notice: Subject to any disclaimer, the term of this patent is extended or adjusted under 35 U.S.C. 154(b) by 1033 days.

(21) Appl. No.: 13/265,976

(22) PCT Filed: Apr. 22, 2010

(86) PCT No.: PCT/US2010/031995
§ 371 (c)(1),
(2), (4) Date: Dec. 29, 2011

(87) PCT Pub. No.: WO2010/126767
PCT Pub. Date: Nov. 4, 2010

(65) Prior Publication Data
US 2012/0115049 A1 May 10, 2012

Related U.S. Application Data

(60) Provisional application No. 61/174,122, filed on Apr. 30, 2009.

(51) Int. Cl.
*H01M 4/86* (2006.01)
*H01M 8/1007* (2016.01)
(Continued)

(52) U.S. Cl.
CPC ....... *H01M 4/8673* (2013.01); *H01M 4/8605* (2013.01); *H01M 4/8657* (2013.01);
(Continued)

(58) Field of Classification Search
CPC .. H01M 4/0402; H01M 4/133; H01M 4/1393; H01M 4/583; H01M 4/663;
(Continued)

(56) References Cited

U.S. PATENT DOCUMENTS

| 4,601,797 A | 7/1986 | Wagenknecht |
| 4,673,473 A | 6/1987 | Ang et al. |

(Continued)

FOREIGN PATENT DOCUMENTS

| CN | 1214710 A | 4/1999 |
| CN | 1386909 A | 12/2002 |

(Continued)

OTHER PUBLICATIONS

Arico, A.S. et al. "DMFCs: From Fundamental Aspects to Technology Development" *Fuel Cells*, 2001, 1(2):133-161.
(Continued)

*Primary Examiner* — Ula C Ruddock
*Assistant Examiner* — Thomas H. Parsons
(74) *Attorney, Agent, or Firm* — Wolf, Greenfield & Sacks, P.C.

(57) ABSTRACT

An embodiment of the invention is an air cathode having a porous membrane with at least one hydrophobic surface that contacts a conductive catalytic film that comprises single walled carbon nanotubes (SWNTs) where the nanotubes are in intimate electrical contact. The conductive film can include fullerenes, metals, metal alloys, metal oxides, or electroactive polymers in addition to the SWNTs. In other embodiments of the invention the air cathode is a component of a metal-air battery or a fuel cell.

23 Claims, 8 Drawing Sheets

(51) Int. Cl.
  *H01M 8/1011* (2016.01)
  *H01M 12/06* (2006.01)
  *H01M 8/1018* (2016.01)

(52) U.S. Cl.
  CPC ....... *H01M 4/8668* (2013.01); *H01M 8/1007*
    (2016.02); *H01M 8/1011* (2013.01); *H01M*
    *12/06* (2013.01); *H01M 2008/1095* (2013.01);
    *Y02E 60/523* (2013.01); *Y10T 29/49124*
    (2015.01)

(58) Field of Classification Search
  CPC ............ H01M 4/8605; H01M 4/8803; H01M
    4/8878; H01M 4/9083; H01M 4/925;
    H01M 8/0236; H01M 8/0239; H01M
    4/8673; H01M 4/8657; H01M 12/06;
    Y02E 60/523
  See application file for complete search history.

(56) References Cited

U.S. PATENT DOCUMENTS

| | | | |
|---|---|---|---|
| 5,013,339 | A | 5/1991 | Mahoney et al. |
| 5,238,674 | A | 8/1993 | Vercoulen et al. |
| 5,417,757 | A | 5/1995 | Merienne et al. |
| 5,456,943 | A | 10/1995 | Guhl et al. |
| 5,560,898 | A | 10/1996 | Uchida et al. |
| 5,853,877 | A | 12/1998 | Shibuta |
| 6,127,061 | A | 10/2000 | Shun et al. |
| 6,232,706 | B1 | 5/2001 | Dai et al. |
| 6,331,262 | B1 | 12/2001 | Haddon et al. |
| 6,369,934 | B1 | 4/2002 | Bechinger et al. |
| 6,566,983 | B2 | 5/2003 | Shin |
| 6,590,231 | B2 | 7/2003 | Watanabe et al. |
| 6,645,455 | B2 | 11/2003 | Margrave et al. |
| 6,831,017 | B1 | 12/2004 | Li et al. |
| 6,903,365 | B1 | 6/2005 | Nihei |
| 6,936,233 | B2 | 8/2005 | Smalley et al. |
| 7,037,619 | B2 * | 5/2006 | Yamaura .............. H01M 4/8605 429/480 |
| 7,060,241 | B2 | 6/2006 | Glatkowski |
| 7,122,165 | B2 | 10/2006 | Wong et al. |
| 7,261,852 | B2 | 8/2007 | Rinzler et al. |
| 7,351,444 | B2 * | 4/2008 | Wang et al. .................. 427/115 |
| 7,572,743 | B2 | 8/2009 | Rinzler et al. |
| 7,704,479 | B2 | 4/2010 | Rinzler et al. |
| 7,776,444 | B2 | 8/2010 | Rinzler et al. |
| 7,972,699 | B2 | 7/2011 | Rinzler et al. |
| 8,168,965 | B2 | 5/2012 | Rinzler et al. |
| 8,221,937 | B2 * | 7/2012 | Dai .................. H01B 1/24 429/513 |
| 9,368,291 | B2 | 6/2016 | Rinzler et al. |
| 9,742,018 | B2 | 8/2017 | Rinzler et al. |
| 2002/0172639 | A1 | 11/2002 | Horiuchi et al. |
| 2002/0176650 | A1 | 11/2002 | Zhao et al. |
| 2003/0122111 | A1 | 7/2003 | Glatkowski |
| 2004/0066094 | A1 | 4/2004 | Suzuki et al. |
| 2004/0197546 | A1 | 10/2004 | Rinzler et al. |
| 2004/0197638 | A1* | 10/2004 | McElrath et al. .............. 429/44 |
| 2004/0198850 | A1 | 10/2004 | Connor et al. |
| 2005/0026411 | A1 | 2/2005 | Tanamoto et al. |
| 2005/0098437 | A1 | 5/2005 | Shiepe |
| 2005/0100960 | A1 | 5/2005 | Dai et al. |
| 2005/0142428 | A1 | 6/2005 | Daimon et al. |
| 2005/0147553 | A1 | 7/2005 | Wong et al. |
| 2005/0199894 | A1 | 9/2005 | Rinzler et al. |
| 2005/0202578 | A1 | 9/2005 | Yaniv et al. |
| 2005/0266162 | A1 | 12/2005 | Luo et al. |
| 2006/0029537 | A1 | 2/2006 | Zhang et al. |
| 2006/0172179 | A1 | 8/2006 | Gu et al. |
| 2006/0220251 | A1 | 10/2006 | Kloster et al. |
| 2006/0223991 | A1 | 10/2006 | Zhang et al. |
| 2006/0237805 | A1 | 10/2006 | Segal et al. |
| 2007/0092787 | A1 | 4/2007 | Wang Chen |
| 2007/0114573 | A1 | 5/2007 | Han et al. |
| 2007/0141345 | A1 | 6/2007 | Rinzler et al. |
| 2007/0172718 | A1 | 7/2007 | Lee et al. |
| 2007/0184972 | A1 | 8/2007 | Roev et al. |
| 2008/0020923 | A1* | 1/2008 | Debe et al. .................. 502/100 |
| 2008/0182155 | A1 | 7/2008 | Choi et al. |
| 2008/0210950 | A1 | 9/2008 | Sung |
| 2009/0136849 | A1 | 5/2009 | Yue et al. |
| 2009/0138649 | A1 | 5/2009 | Chew et al. |
| 2009/0246625 | A1 | 10/2009 | Lu |
| 2010/0097742 | A1 | 4/2010 | Adzic et al. |
| 2010/0272981 | A1 | 10/2010 | Rinzler et al. |
| 2011/0186785 | A1 | 8/2011 | Kato et al. |
| 2012/0031852 | A1 | 2/2012 | Aglietto |
| 2012/0045688 | A1 | 2/2012 | Liu et al. |
| 2012/0115049 | A1 | 5/2012 | Rinzler et al. |
| 2013/0026029 | A1 | 1/2013 | Kayeart et al. |
| 2013/0105304 | A1 | 5/2013 | Kaczur et al. |
| 2013/0146470 | A1 | 5/2013 | Wang et al. |
| 2013/0273446 | A1 | 10/2013 | Rinzler et al. |
| 2014/0083752 | A1 | 3/2014 | Walczak et al. |
| 2016/0185602 | A1 | 6/2016 | Walczak et al. |
| 2016/0192484 | A1 | 6/2016 | Walczak et al. |
| 2016/0281245 | A1 | 9/2016 | Rinzler et al. |
| 2017/0005351 | A1 | 1/2017 | Rinzler et al. |

FOREIGN PATENT DOCUMENTS

| | | |
|---|---|---|
| CN | 1466788 A | 1/2004 |
| CN | 1546431 A | 11/2004 |
| CN | 2893940 Y | 4/2007 |
| CN | 100595953 C | 3/2010 |
| CN | 101721944 A | 6/2010 |
| CN | 103140608 A | 6/2013 |
| CN | 103233240 A | 8/2013 |
| EP | 1 878 763 A2 | 1/2008 |
| JP | H06-038265 U | 5/1994 |
| JP | H07-048111 A | 2/1995 |
| JP | 2000-086216 A | 3/2000 |
| JP | 2000-203821 A | 7/2000 |
| JP | 2001-035362 A | 2/2001 |
| JP | 2002-305087 A | 10/2002 |
| JP | 2002-338221 A | 11/2002 |
| JP | 2002-346996 A | 12/2002 |
| JP | 2003-146632 A | 5/2003 |
| JP | 2003-178816 | 6/2003 |
| JP | 2003-209270 A | 7/2003 |
| JP | 2003-288835 A | 10/2003 |
| JP | 2004-042253 A | 2/2004 |
| JP | 2004-080987 A | 3/2004 |
| JP | 2004-158290 | 6/2004 |
| JP | 2004-315297 A | 11/2004 |
| JP | 2004-537174 A | 12/2004 |
| JP | 2005-047763 A | 2/2005 |
| JP | 2005-057012 A | 3/2005 |
| JP | 2005-294109 A | 10/2005 |
| JP | 2006-513557 A | 4/2006 |
| JP | 2006-265151 A | 10/2006 |
| JP | 2007-515364 A | 6/2007 |
| JP | 2007-214130 A | 8/2007 |
| JP | 2007-258030 A | 10/2007 |
| JP | 2007-297644 A | 11/2007 |
| JP | 2008-505832 A | 2/2008 |
| JP | 2008-542980 A | 11/2008 |
| JP | 2009-093983 A | 4/2009 |
| JP | 2009-533227 A | 9/2009 |
| JP | 2009-536911 A | 10/2009 |
| JP | 2009-541198 A | 11/2009 |
| JP | 2010-506824 A | 3/2010 |
| JP | 2010-515779 A | 5/2010 |
| JP | 2010-255018 A | 11/2010 |
| JP | 2010-232040 A | 4/2012 |
| JP | 2012-082120 A | 4/2012 |
| KR | 10-1999-0082415 A | 11/1999 |
| KR | 10-2001-0101692 | 11/2001 |
| KR | 10-2007-0730197 | 6/2007 |
| KR | 2007-0100594 A | 10/2007 |
| KR | 10-2009-0079935 A | 7/2009 |
| RU | 2303836 C1 | 7/2007 |
| WO | WO 97/00925 A1 | 1/1997 |

(56) References Cited

FOREIGN PATENT DOCUMENTS

| WO | WO 98/25758 A1 | 6/1998 |
|---|---|---|
| WO | WO 03/107451 A2 | 12/2003 |
| WO | WO 2004/009884 A1 | 1/2004 |
| WO | WO 2004/040590 A2 | 5/2004 |
| WO | WO 2004-109837 | 12/2004 |
| WO | WO 2005/014889 A2 | 2/2005 |
| WO | WO 2005/029528 A1 | 3/2005 |
| WO | WO 2005/044723 A2 | 5/2005 |
| WO | WO 2005/083751 A2 | 9/2005 |
| WO | WO 2006/001790 A1 | 1/2006 |
| WO | WO 2006/011655 A1 | 2/2006 |
| WO | WO 2007/004758 A1 | 1/2007 |
| WO | WO 2007/101906 A1 | 3/2007 |
| WO | WO2007095492 * | 8/2007 |
| WO | WO 2008/034939 A1 | 3/2008 |
| WO | WO 2008/046010 A2 | 4/2008 |
| WO | WO 2008/054473 A2 | 5/2008 |
| WO | WO 2010/102759 A1 | 9/2010 |
| WO | WO 2010/126767 A2 | 11/2010 |

OTHER PUBLICATIONS

Bidault, F. et al. "Review of gas diffusion cathodes for alkaline fuel cells" *Journal of Power Sources*, 2009, 187:39-48.
Gong, K. et al. "Nitrogen-Doped Carbon Nanotube Arrays with High Electrocatalytic Activity for Oxygen Reduction" *Science*, Feb. 6, 2009, 323:760-764.
Kongkanand, A. et al. "Single-Wall Carbon Nanotubes Supported Platinum Nanoparticles with Improved Electrocatalytic Activity for Oxygen Reduction Reaction" *Langmuir*, 2006, 22(5):2392-2396.
Villalpando-Paez et al., Synthesis and characterization of long strands of nitrogen-doped single-walled carbon nanotubes. Chem Phys Lett. 2006;424:345-352.
Wagner et al., Change of electrochemical impedance spectra (EIS) with time during CO-poisoning of the Pt-anode in a membrane fuel cell. J Power Sources. 2004;127:341-347.
Wu et al., Green Power Source Material. Chemical Industry Publishing House. 2008: 268.
English Translation of CN 1466788 (Sony Corp., published Jan. 7, 2004).
International Search Report and Written Opinion dated Dec. 10, 2008 in connection with Application No. PCT/US2007/078230.
International Preliminary Report on Patentability dated Mar. 17, 2009 in connection with Application No. PCT/US2007/078230.
Partial European Search Report dated Oct. 5, 2016 in connection with Application No. EP 10770141.9.
International Search Report and Written Opinion dated Nov. 19, 2010 in connection with Application No. PCT/US2010/031995.
International Preliminary Report on Patentability dated Nov. 10, 2011 in connection with Application No. PCT/US2010/031995.
International Search Report and Written Opinion dated Jun. 3, 2005 in connection with Application No. PCT/US2005/005575.
International Preliminary Report on Patentability dated Apr. 13, 2006 in connection with Application No. PCT/US2005/005575.
International Search Report and Written Opinion dated Apr. 5, 2007 in connection with Application No. PCT/US2006/036723.
International Preliminary Report on Patentability dated Mar. 26, 2008 in connection with Application No. PCT/US2006/036723.
International Search Report and Written Opinion dated Sep. 26, 2008 in connection with Application No. PCT/US2007/081770.
International Preliminary Report on Patentability dated Apr. 22, 2009 in connection with Application No. PCT/US2007/081770.
International Search Report and Written Opinion dated Mar. 10, 2015 in connection with Application No. PCT/US14/66714.
International Preliminary Report on Patentability dated Jun. 2, 2016 in connection with Application No. PCT/US14/66714.
Extended European Search Report dated Jun. 26, 2014 in connection with Application No. EP 11847983.1.
International Search Report and Written Opinion dated Aug. 28, 2012 in connection with Application No. PCT/US2011/065569.
International Preliminary Report on Patentability dated Jun. 27, 2013 in connection with Application No. PCT/US2011/065569.
Extended European Search Report dated Aug. 6, 2014 in connection with Application No. EP 12767499.2.
International Search Report and Written Opinion dated Oct. 19, 2012 in connection with Application No. PCT/US2012/031950.
International Preliminary Report on Patentability dated Oct. 17, 2013 in connection with Application No. PCT/US2012/031950.
Office communication dated Jan. 26, 2016 for Application No. JP 2014-503905.
[No Author Listed], New ink-jet technology for the formation of ultra fine dots less than 1/1000 the size of currently achieved. National Institute of Advanced Industrial Science and Technology (AIST). Press Release. Apr. 1, 2002. http://www.aist.go.jp/alst_e/new_research/20020401/20020401.html [last accessed Aug. 23, 2005]. 3 pages.
[No Author Listed], Product Information Sheet for Triton X-100. CAS No. 9002-93-1. Sigma-Aldrich. 2 pages.
Barazzouk et al., Single-Wall Carbon Nanotube Films for Photocurrent Generation. A Prompt Response to Visible-Light Irradiation. J Phys Chem B. 2004;108:17015-8.
Bethune et al., Cobalt-catalysed growth of carbon nanotubes with single-atomic-layer walls. Lett Nature. 1993;363:605-7.
Beverskog et al., Revised Pourbaix diagrams for nickel at 25-300° C. Corros Sci. May 1997;39(5):969-80.
Bradley et al., Short-channel effects in contact-passivated nanotube chemical sensors. Appl Phys Lett. 2003;83(18):3821-3.
Butt, Carbon-NanoTube Transistors. Purdue University, School of Electrical and Computer Engineering. 6 pages.
Chen et al., Chemically doped double walled carbon nanotubes. Cylindrical Molecular Capacitors. Jun. 27, 2003;90(25):257403.1-4.
Choi et al., Pyrene-containing polystyrene segmented copolymer from nitroxide mediated polymerization and its application for the noncovalent functionalization of as-prepared multiwalled carbon nanotubes. Eur Polym J. Jul. 11, 2008;44:3087-95.
Du et al., Effect of nanotube alignment on percolation conductivity in carbon nanotube/polymer composites. Phys Rev B. 2005;72:12140.1-4.
Du et al., Preparation and preliminary property study of carbon nanotubes films by electrophoretic deposition. Mater Lett. 2002;57:434-8.
Fan et al., Self-Oriented Regular Arrays of Carbon Nanotubes and their Field Emission Properties. Science. Jan. 22, 1999;283:512-4.
Feng et al., Water Soluble Multi-Walled Nanotube and its Film Characteristics. Chin Phys Lett. 2003;20(5):753-5.
Ferrer-Anglada et al., Conducting transparent thin films based on Carbon Nanotubes—Conducting Polymers. Electronics Properties of Synthetic Nanostructures. Ed. Kuzmany et al. CP723. 2004;591-4.
Ferrer-Anglada et al., Synthesis and characterization of carbon nanotube-conducting polymer thin films. Diamond Rel Mater. 2004;13:256-60.
Fischer, Magnetically aligned single wall carbon nanotube films:Preferred orientation and anisotropic transport properties. J Appl Phys. Feb. 15, 2003;93(4):2157-63.
Girishkumar et al., Single-wall carbon nanotube-based proton exchange membrane assembly for hydrogen fuel cells. Langmuir. 2005;21(18):8487-94.
Godbole et al., Deposition and characterization of silver nano-films by a novel solid liquid interface reaction technique (SLIRT). Mater Lett. 2005;59:1958-61.
Guo et al., Multi-layer LB films of single-wall carbon nanotubes. Physica B. 2002;323:235-6.
Huang et al., Growth of aligned SWNT arrays from water-soluble molecular cluster for nanotube device fabrication. Phys Chem Chem Phys. 2004;6:1077-9.
Huang et al., Self-organizing high-density single-walled carbon nanotube arrays from surfactant suspensions. Nanotech. 2004;15:1450-4.
Jacquemin et al., Doping mechanism in single-wall carbon nanotubes studied by optical absorption. Synth Metal. 2000;115:283-7.

(56) References Cited

OTHER PUBLICATIONS

Kaempgen et al., Transparent CNT Composites, Molecular Nanostructures. XVII International Winterschool/Euroconference on Electronic Properties of Novel Materials. 2003;554-8.
Kataura et al., Optical Properties of Single-Wall Carbon Nanotubes. Synth Metal. 1999;103:2555-8.
Kavan et al., Electrochemical Tuning of Electronic Structure of Single-Walled Carbon Nanotubes: In-situ Raman and Vis-NIR Study. J Phys Chem. 2001;105:10764-71.
Kazaoui et al., Electrochemical tuning of electronic states in single-wall carbon nanotubes studies by in situ absorption spectroscopy and ac resistance. Appl Phys Lett. May 28, 2001;78(22):3433-5.
Kim et al., Homogenous and structurally controlled thin films of single-wall carbon nanotubes by the Langmuir-Blodgett technique. Synth Metal. 2003;(135-6):747-8.
Kim et al., Langmuir-Blodgett films of single-wall carbon nanotubes: layer-by-layer deposition and in-place orientation of tubes. Jap J Appl Phys. 2003;43(12):7629-34.
Kinoshita, Carbon: Electrochemical and physicochemical properties. John Wiley & Sons. 1988;372-3.
Le Goff et al., From hydrogenases to noble metal-free catalytic nanomaterials for $H_2$ production and uptake. Science. Dec. 4, 2009;326(5958):1384-7. doi: 10.1126/science.1179773.
Lee et al., Single Wall Carbon Nanotubes for p-Type Ohmic Contacts to GaN Light-Emitting Diodes. Nano Lett. 2004;4(5):911-4.
Li et al., Carbon nanotube film by filtration as cathode catalyst support for proton-exchange membrane fuel cell. Langmuir. Oct. 11, 2005;21(21):9386-9.
Lijima, Helical microtubules of graphitic carbon. Lett Nature. 1991;354:56-8.
Liu et al., Electrochemical Characterization of Films of Single-Walled Carbon Nanotubes and Their Possible Application in Supercapacitors. Electrochem Solid-State Lett. 1999;11:577-8.
Liu et al., Stable non-covalent functionalization of multi-walled carbon nanotubes by pyrene-polyethylene glycol through [pi]-[pi] stacking. New Journal of Chem. 2009;33:1017-24.
Meitl et al., Solution Casting and Transfer Printing Single-Walled Carbon Nanotube Films. Nano Lett. 2004;4(9):1643-7.
Merki et al., Amorphous molybdenum sulfide films as catalysts for electrochemical hydrogen production in water. Chem Sci. 2011;2:1262-7.
Mickelson et al., Fluorination of single-wall carbon nanotubes. Chem Phys Lett. 1998;296:188-94.
Minami, Optical properties of semiconducting and metallic single wall carbon nanotubes: effects of doping and high pressure. Synth Metal. 2001;116:405-9.
Miranda et al., Design of a chemical sensor based on a Carbon Nanotube functionalized with DNA. PASEO 2009. Buenos Aires, Argentina. Mar. 2009 7 pages.
Misra et al., Hydrogen evolution on hydrophobic aligned carbon nanotube arrays. ACS Nano. Dec. 22, 2009;3(12):3903-8. doi: 10.1021/nn900878d.
Nguyen et al., Synthesis of multi-walled carbon nanotubes for $NH_3$ gas detection. Physica E. 2007;37:54-7.
Nikolaev et al., Gas-phase catalytic growth of single-walled carbon nanotubes from carbon monoxide. Chem Phys Lett. 1999;313:91-7.
Nilsson et al., Scanning field emission from patterned carbon nanotube films. Appl Phys Lett. Apr. 10, 2000;76(15):2071-3.
Nose et al., Electrochemical oxidation of highly oriented pyrolytic graphite in sulphuric acid solution under potential pulse condition. Fuel Cells. Jun. 2009;9(3):284-90.
Novak et al., Macroelectronic application of carbon nanotube networks. Solid-State Electron. 2004;48:1753-6.
Oh et al., Organic molecules as mediators and catalysts for photocatalytic and electrocatalytic $CO_2$ reduction. Chem Soc Rev. 2013;42(6):2253-61.
Papakonstantinou et al., Fundamental electrochemical properties of carbon nanotube electrodes. Fullerenes Nanotubes Carb Nanostruct. Dec. 2005;13:91-108.
Pawlowski et al., Novel photoacid generators. Key components for the progress of chemically amplified photoresist systems. J Photopolymer Sci Tech. 1991;4(3):389-402.
Peltola et al., Carbon-Nanotube Transparent Electrodes for Flexible Displays. Info Displays. Feb. 2007;2-5.
Peng et al., Carbon Nanotube Chemical and Mechanical Sensors. Conference Paper for the 3rd International Workshop on Structural Health Monitoring. Stanford, CA. Sep. 12-14, 2001. 8 pages.
Petrov et al., Noncovalent functionalization of multi-walled carbon nanotubes by pyrene containing polymers. Chem Commun (Camb). Dec. 7, 2003;(23):2904-5.
Powell et al., A laboratory exercise introducing students to the Pourbaix diagram for cobalt. J Chem Educ. 1987;64(2):165-7.
Prosini et al., Electrochemical studies of hydrogen evolution, storage and oxidation on carbon nanotube electrodes. J Power Sources. 2003;118(1):265-9.
Rai et al., Dispersions of Functionalized Single-Walled Carbon Nanotubes in Strong Acids: Solubility and Rheology. J Nanosci Nanotech. 2007;7:3378-85.
Raudino et al., Modeling of low-temperature depolymerization of poly(methyl methacrylate) promoted by ion beam. J Chem Phys. Jul. 22, 1999;111(4):1721-31.
Rinzler et al., Large-scale purification of single-wall carbon nanotubes: process, product, and characterization. Appl Phys A. 1998;67:29-37.
Robinson et al., Improved chemical detection using single-walled carbon nanotube network capicitors. Sensors Actuators A. 2007;135:309-14.
Ryan et al., Novel sub-ceiling temperature rapid depolymerization-repolymerization reactions of cyanoacrylate polymers. Macromolec Rapid Comm. 1996;17:217-27.
Sakakibara et al., Near-infrared saturable absorption of single-wall carbon nanotubes prepared by laser ablation method. Jap J Appl Phys. 2003;42(5A):L494-6. Abstract.
Salzmann et al., Highly hydrophilic and stable polypeptide/single-wall carbon nanotube conjugates. J Mater Chem. 2008;18:1977-83.
Sreekumar et al., Single-Wall Carbon Nanotube Films. Chem Mater. 2003;15:175-8.
Urbonaite, Synthesis and characterisation of carbide derived carbons. Doctoral Thesis, Department of Physical, Inorganic and Structural Chemistry, Stockholm University. 2008:1-82.
Wang et al., Light Scattering Study on SWNTs Solutions. American Physical Society. Annual APS March Meeting 2003. Mar. 3-7, 2003. Meeting Session C1, Poster Session I. Abstract No. C1.014. 1 page.
Ward et al., A nonvolatile nanoelectromechanical memory element utilizing a fabric of carbon nanotubes. Non-Volatile Memory Technology Symposium. 2004;34-8. Abstract.
Winther-Jensen et al., Conducting polymer composite materials for hydrogen generation. Adv Mater. Apr. 18, 2010;22(15):1727-30. doi: 10.1002/adma.200902934.
Wu et al., Transparent Conductive Carbon Nanotube Films. Science. Aug. 27, 2004;305:1273-6.
Xue et al., The preparation of highly water-soluble multi-walled carbon nanotubes by irreversible noncovalent functionalization with a pyrene-carrying polymer. Nanotech. May 28, 2008;19(21):215604. doi: 10.1088/0957-4484/19/21/215604. Epub Apr. 21, 2008. 7 pages.
Yamada et al., Toward Environmentally Friendly Photolithographic Materials: A New Class of Water-Soluble Photoresists. Macromolec. 2004;37(2):377-84.
Yang et al., Functionalization of multiwalled carbon nanotubes by pyrene-labeled hydroxypropyl cellulose. J Phys Chem B. Oct. 16, 2008;112(41):12934-9. doi: 10.1021/jp805424f. Epub Sep. 23, 2008.
Yang et al., Hydrogen generation using PPy-FMS modified PVDF membrane and other substrates. Synth Metals. 2005;154:69-72.
Yang et al., Preparation and characterization of water-soluble single-walled carbon nanotubes by hybridization with hydroxypropyl cellulose derivatives. Ind Eng Chem Res. 2010;49(6):2747-51.
Yuan et al., Electronic interactions and polymer effect in the functionalization and solvation of carbon nanotubes by pyrene-and ferrocene-containg poly(1-alkynes)s. Macromol. Feb. 2008;41(3):701-7.
Yuan et al., Property Control of Single Walled Carbon Nanotubes and Their Devices. Dissertation. Department of Chemistry, Duke University. Dec. 2008 167 pages.

(56) References Cited

OTHER PUBLICATIONS

Zhang et al., Microwave-assisted synthesis of Pt/CNT nanocomposite electrocatalysts for PEM fuel cells. Nanoscale. Feb. 2010;2(2):282-6. doi: 10.1039/b9nr00140a. Epub Oct. 12, 2009.
Extended European Search Report dated Apr. 5, 2017 for Application No. EP 10770141.9.
Van De Witte et al., Phase separation processes in polymer solutions in relation to membrane formation. J Membrane Sci. Jan. 1, 1996;117:1-31.
Chinese Office Action for Chinese Application No. 201480063051.7 dated Jul. 4, 2017.
Extended European Search Report dated May 26, 2017 for Application No. EP 14864890.0.
Muzibur et al., Studies of Electrochemical Behaviour of SWNT-Film Electrodes. J. Braz. Chem. Soc. 2007. 18;1150-7.
Shao et al., Comparative Investigation of the Resistance to Electrochemical Oxidation of Carbon Black and Carbon Nanotubes in Aqueous Sulfuric Acid Solution. Electrochimica Acta. 2006. 51. 5853-7.

\* cited by examiner

SINGLE WALL CARBON NANOTUBE BASED AIR CATHODES

CROSS-REFERENCE TO RELATED APPLICATIONS

This application is the U.S. national stage application of International Patent Application No. PCT/US2010/031995, filed Apr. 22, 2010, which claims the benefit of U.S. Provisional Application Ser. No. 61/174,122, filed Apr. 30, 2009, the disclosures of which are hereby incorporated by reference in their entireties, including any figures, tables, or drawings.

BACKGROUND OF INVENTION

Metal-air batteries are potentially the least expensive primary batteries available, typically have a very high energy density and are environmentally benign. They have the highest gravimetric and volumetric energy density of any primary battery system. Recharging of these batteries is relatively ineffective. Developmental rechargeable metal-air batteries have a life of only a few hundred cycles and an efficiency of only about 50%. However, metal-air batteries can be refueled, often referred to as a metal-air fuel cell when configured for refueling, where the consumed metal is mechanically replaced and the spent metal oxide can be reduced to the metal in a separate device. The term metal-air fuel cell is also used in reference to an electro-chemical system where the metal is used as a co-reactant to assist the reformation of an alternate fuel, for example hydrogen, a hydrocarbon, or an alcohol. As such a "metal" economy where vehicles and portable equipment and devices can be powered by these metal-air batteries or metal-air fuel cells has been envisioned.

Research is ongoing for electric vehicles using metal-air batteries, especially zinc-air batteries as zinc is inexpensive and readily mass produced. These batteries have specific energies up to 370 W·h/kg whose terminal voltage does not drop until 80-85% depletion of the metal. Such batteries have very long shelf lives when sealed to exclude oxygen but having very high self-discharge rates when exposed to air. Small zinc-air batteries are commonly used for hearing aids, and a line of very thin zinc-air batteries are being introduced in mid-2009 for use as low cost long-life primary batteries for consumer electronic devices.

The anodes of metal-air batteries are commonly metals in a particulate form mixed with an electrolyte, such as a hydroxide, in the form of a paste that release electrons upon oxidation. The air electrodes are typically made of porous carbon structures on metal meshes that are covered with oxygen reduction catalysts forming hydroxide by the reduction of oxygen and its subsequent reaction with water. Where the metal is zinc, the reaction has a potential to produce a maximum of 1.65 V, which is typically reduced to 1.35 to 1.4 V by limiting the air flow into the cell.

Air cathodes used in polymer electrolyte membrane (PEM) fuel cells typically contain metals, in particular precious metals such as platinum. These cathodes can work well, but they are typically very expensive. Improvements in metal-air batteries and fuel cells are generally tied to improvements in the air cathodes.

Nearly all air cathodes are a typically sheet-like members having opposite surfaces exposed to the atmosphere and to the aqueous electrolyte of the cell. The air cathode must be permeable to air or another source of oxygen, but must be substantially hydrophobic so that aqueous electrolyte will not seep or leak through it and has an electrically conductive element connected to external circuitry. The construction of conventional air cathodes is described by Bidault et al, "Review of gas diffusion cathodes for alkaline fuel cells" *Journal of Power Sources,* 187 (2009) 39-48. Generally they comprise a thick film, having multiple layers of nanoscale metal catalyst impregnated active carbon that are mixed with polytetrafluoroethylene (PTFE) particles affixed to an electrically conducting backing layer. They achieve a high areal oxygen reduction capability because of a large three phase interface between the meandering hydrophobic PTFE particles and the electrolyte wetted carbon supported catalyst.

These conventional air cathodes often display several shortcomings. As few of the pathways are purely hydrophobic, containing a mixture of hydrophilic catalyst and carbon, pores constructed to provide pathways for gas phase oxygen penetration to the catalyst particles can flood with electrolyte. Flooding greatly slows the diffusion of oxygen to the catalyst surfaces. Prevention of flooding requires that the pressure and humidity of the oxygen source be carefully controlled. A second shortcoming is a kinetic barrier to diffusion of the hydroxide ions because of the tortuous pathway for ion diffusion through the hydrophilic portion of the cathode that generates current limiting impedance. The metal catalysts are often a precious metal, such as platinum, which renders the cathode relatively expensive. A major fraction of the precious metal used in fuel cells, hence its cost, lies in the cathode.

For hydrocarbon fuel cells, such as direct methanol fuel cells, methanol cross over from the anode to the cathode is a major issue. Power generation efficiency of the direct methanol fuel cell significantly decreases when methanol or methanol oxidation products reach the cathode side of the cell. Proton exchange membranes, such as Nafion® membranes, are currently used in many fuel cell to significantly reduce, rather than to prevent, the methanol cross over from anode to cathode while maintaining the proton conduction, as reviewed by Arico et al, in "DMFCs: from fundamental aspects of technology development" *Fuel Cells* 1, (2001) 133-161. In Pt-containing conventional air cathodes, the nanoscale metal particles are subject to migration, agglomeration and particle growth by Oswald ripening. Since agglomeration and particle growth reduce the surface area of the catalytic sites, the efficiency of the cathode degrades over time. Precious metal catalysts are also subject to poisoning by carbon monoxide, which can form during fuel oxidation, or from impurities in the oxygen source and/or fuel.

Hence an air cathode that avoids precious metals, is thin, resists flooding, has little or no hydroxide ion diffusion barrier, and is not poisoned by CO would constitute a significant improvement in technologies that employ them.

BRIEF SUMMARY

Embodiments of the invention are directed to air cathodes for metal-air batteries or fuel cells where a porous membrane with at least one hydrophobic surface has a conductive catalytic film comprising single walled carbon nanotubes (SWNTs) contacting the hydrophobic surface of the porous membrane. The SWNTs of the conductive catalytic film displays intimate electrical contact between the SWNTs and in many embodiments display intimate physical contact between the SWNTs throughout the film. The hydrophobic surface can be made of a polymer, ceramic, or glass. As needed, the hydrophilic surface can be treated to form the hydrophobic surface. The hydrophobic polymer can be polytetrafluoroethylene, polyvinylidene fluoride, polyethylene, polypropylene, any polyamide, any polysulfone, or a polyolefin with perfluoroalkyl side chains. In some embodiments of the invention, the porous membrane with a hydrophobic surface has a non-planer topography and the conductive catalytic film conforms to the non-planer topography of the hydrophobic surface.

In some embodiments of the invention, the SWNTs can be charge transfer doped, for example by a graphite intercalant, or substitutionally doped where, for example, carbons atoms of the nanotube can be replaced with boron or nitrogen atoms. In other embodiments of the invention, fullerenes or fullerene derivatives can be included in the conductive catalytic film. In other embodiments of the invention the conductive catalytic films can also include metal particles, metal alloy particles, metal oxides particles, conductive carbon fibers having micron scale diameters, or any combination thereof. In another embodiment of the invention, the conductive catalytic films can include conjugated polymers, for example a sticky foot polymer. For example, in one embodiment of the invention a sticky foot polymer has pendant substituents that can either increase or decrease the hydrophobicity of the SWNTs of the conductive catalytic film. The conductive catalytic film can be 10 to 20,000 nm in thickness.

Other embodiments of the invention are directed to metal-air batteries having an air cathode of any of the above embodiments and an anode containing a metal. The metal can be titanium, zinc, aluminum, magnesium or lithium. Other embodiments are directed to a fuel cell having an air cathode of any of the above embodiments and an anode where fuel is oxidized. The fuel can be hydrogen, a hydrocarbon or an alcohol.

Other embodiments of the invention are directed to a method of preparing an air cathode. The air cathode is constructed by depositing a suspension containing SWNTs as a uniform film on a hydrophobic surface of a porous membrane, such that the film conforms to the topography of the hydrophobic surface, and washing the film with a solvent such that intimate electrical contact between SWNTs is achieved. The SWNTs can be deposited by filtration through the porous membrane to leave the film on the membrane. A conductor, such as a metal, can be attached to a portion of the film to permit connection of the air cathode to an external circuit. In some embodiments of the invention the suspension can include, separately or in combination, fullerenes or fullerene derivatives, metal particles, metal alloy particles, metal oxides particles, electroactive polymer, or conductive carbon fibers having micron scale diameters. In other embodiments of the invention the SWNT film can be modified by having fullerenes, metal particles, metal alloy particles, metal oxides particles, electroactive polymer, or any combination thereof subsequently deposited on the film.

DETAILED DISCLOSURE

Figure 1A:
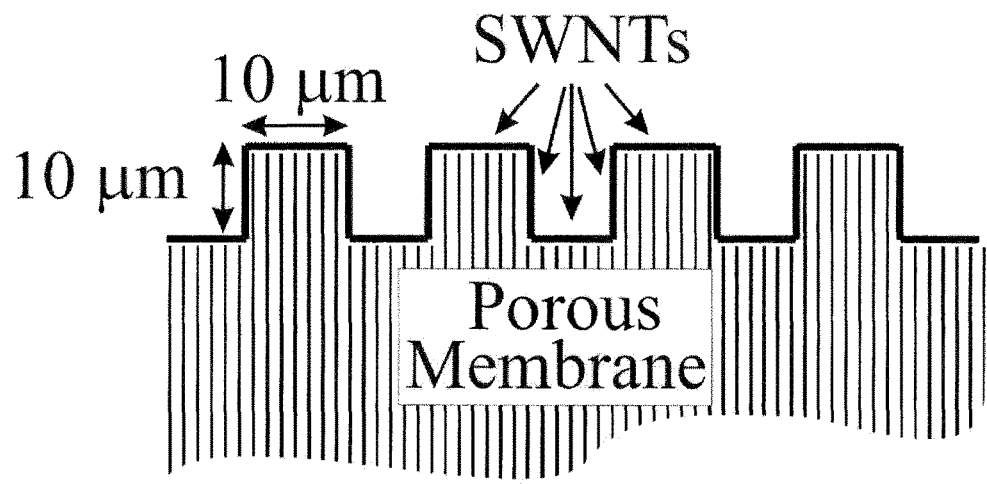
FIG. 1 shows cross sections of patterned membranes covered with SWNT films where the surface comprises a) 10 μm pillars and b) 30 μm pillars according to embodiments of the invention.

Embodiments of the invention are directed to SWNT comprising air (oxygen reduction cathodes, which are gas diffusion cathodes where the gas contains some oxygen) that can be used in metal-air batteries and fuel cells. In one embodiment of the invention, the air cathode comprising SWNTs has high oxygen reduction capability and is not poisoned by carbon monoxide. Embodiments of the invention are directed to films of the SWNTs that have a maximized triple phase interface of the air cathode for a maximized oxygen reduction rate in a metal-air battery or fuel cell that include the novel air cathode. Other embodiments of the invention are directed to formation of an air cathode with a large three phase interface that permits the achievement of very high oxygen reduction rates by a filtration method where the filtration membrane and the filtrate comprise the air cathode. Other embodiments of the invention are directed to metal-air batteries or fuel cells comprising air cathodes comprising SWNTs.

In one embodiment of the invention an air cathode comprises a membrane with a plurality of pores and a conductive catalytic film of SWNTs in physical contact to one face of the membrane. The membrane has at least one surface that resists wetting by water to resist flow of an aqueous solution, for example an electrolyte solution, or other hydrophilic fluid through the pores of the membrane unless a pressure differential, or other potential difference that can encourage a flow of a fluid through the pores, is applied to the membrane. The membrane allows air or other oxygen containing gas to flow through the pores to the SWNT film on a single face of the membrane but resists the flow of an electrolyte solution through the membrane from the face having the SWNT film. In embodiments of the invention the porous membrane can be constructed of a hydrophobic polymer, for example, tetrafluoroethylene (PTFE), polyvinylidene fluoride (PVDF), polyethylene, polypropylene, polyester or polyamide. In other embodiments of the invention, the porous membrane can be a polymer generally considered hydrophilic where the surface has been treated to achieve a hydrophobic surface. In other embodiments of the invention, the membrane can be a porous glass or ceramic that can be inherently resistant to wetting or can be treated to generate a hydrophobic surface. For example a sintered glass membrane can be surface treated with a silane coupling agent to render the surface hydrophobic and poorly wettable by an aqueous solution.

The film comprises a plurality of SWNTs that are oriented with their long axis approximately parallel to the local surface of the membrane but with the nanotubes randomly oriented within the local plane of the film, such that there is intimate electrical contact, generally with intimate physical contact, between nanotubes over the entire surface of the film. In this manner the electrical conductivity over the entire film can be high for a very thin film, for example of about 20 nm to about 200 nm in thickness. Embodiments of the invention having thin SWNT films are advantageous due to the relatively high cost of SWNTs, however, thicker films, for example even 1 to 100 μm, can be used.

The novel air cathodes according to embodiments of the invention that comprise SWNT film on a hydrophobic membrane solve a number of technical problems common to metal-air batteries and fuel cells. The novel air cathodes resist the flooding of the pores of the membrane, which hinders oxygen diffusion in some state of the art metal-air batteries. In some embodiments of the invention, because very thin SWNT films are used, the ion diffusion barrier is minimized relative to state of the art systems employing air cathodes. No precious metal catalyst is required in the SWNT/hydrophobic membrane based air cathodes. Generally, the quantity of the precious metal needed is high and the thin SWNT films of the present invention require much less of an expensive material, which can be used for significantly longer periods of time. Poisoning of cathode, particularly by CO in fuel cells, does not occur for the novel air cathodes. The fuel used in many fuel cells can reduce the activity of a typical air cathode, but is inert to the novel air cathodes of the present invention. For example, a methanol fuel cell requires a proton exchange membrane to function when a traditional precious metal based air cathode is used as even 1% methanol can drastically reduce the activity of the cathode. The traditional precious metal catalyst can migrate or undergo Oswald ripening that result in deactivation of the air cathode, neither of which occurs with the SWNT comprising air cathodes according to embodiments of the invention.

For some embodiments of the invention directed to metal-air batteries, electrochemical dissolution of the metallic electrode that makes contact with the nanotube film is avoided by placing the metal electrode against a seal which forms a boundary to an electrolyte solution. In a cell that is filled with electrolyte, the SWNT film of the air cathode is wetted throughout including the membrane surface. Because of the hydrophobicity of the membrane electrolyte solution does not penetrate into its open pore structure. The side of the membrane opposite the SWNT film is contacted by a gas phase medium containing oxygen or another oxidizer. In many embodiments, the gas phase medium is air. Oxygen diffuses through the pores of the membrane to the three phase interface where the oxidizing gas, the solid SWNT film and the liquid electrolyte are present. At this three phase interface, oxygen dissolves into the surface layer of electrolyte solution wetting the SWNTs and is reduced upon contact with the SWNT film cathode by the electrons provided from the external circuit through the SWNT film. The reduced oxygen forms hydroxide by reaction with water in an aqueous electrolyte solution and diffuses through the electrolyte solution to combine with metal ions of a metal anode of a metal-air battery. In embodiments of the invention directed to hydrogen, methanol or microbial fuel cells, reduced oxygen species combines with protons that are present in the electrolyte as a result of reaction at the anode.

The air cathode can be fabricated by the deposition of a SWNT thin film on a porous hydrophobic membrane used as a filtration membrane for the process of making a SWNT film as taught in Rinzler et al., U.S. Pat. No. 7,261,852, which is herein incorporated in its entirety by reference. When the pores of the hydrophobic membrane are small, for example about 0.1 to about 0.22 μm, the SWNTs are deposited on a single surface of the membrane when a suspension of the SWNTs is forced through the membrane by a pressure differential formed by the application of a pressure, for example a gas pressure on the SWNT side of the membrane, reduction of the pressure on the side of the membrane opposite the SWNTs, or a combination of both. Subsequently, surfactants used to from a dispersion of SWNTs can be washed from the SWNTs as desired or needed such that surfactant does not aid in the diffusion of electrolyte solution into the pores of the membrane under operational conditions. The SWNT film and hydrophobic membrane is then dried to leave a continuous highly electrically conducting film supported on the hydrophobic membrane. In embodiments of the invention a metal can be deposited by any of various techniques, such as evaporation or electrolytic deposition, on a specific portion of the SWNT film, for example in one edge of the nanotube film, to make sufficient electrical contact to the SWNTs that readily allows connection of the air cathode to an external circuit. In some embodiments of the invention long carbon fibers can be dispersed such that the carbon fibers extend across the major fraction of the membrane surface lying on top of, or intertwined with, the deposited nanotubes, which can further improve the electrical conductance of the nanotube films.

As can be appreciated by one skilled in the art, the utility of any air cathode for any material is improved as the effective size of the three phase interface increases. Embodiments of the invention include a modified porous membrane, where the membrane's surface is patterned to have a topography of protrusions and/or pits. Deposition of the SWNT film on the patterned porous membrane is carried out such that the SWNT film contacts the membrane and conforms to the topography of the contacted membrane surface. Because the nanotubes are drawn to the entire accessible surface of the membrane via the hydrodynamic drag forces of the permeating suspension during SWNT film fabrication, the film assembles on all surfaces of the patterned face of the membrane, which significantly increases the contact area between the SWNT film and the membrane and increases the size of the three phase interface.

Membrane patterning can be accomplished by several methods. For example, for membrane materials formed by casting a liquid polymer dope (e.g. PVDF, Nylon, polysulfone), where the liquid dope has a membrane polymer dissolved in a mixture of a solvent, optional co-solvents and a non-solvent, the liquid dope is cast and doctor bladed onto a flat substrate surface where it hardens to form the porous membrane. Phase segregation between the evaporating solvent and non-solvent constituents of the dope forms the porosity in the membrane as these constituents are driven off in an environment having a controlled temperature and pressure. In one embodiment of the invention, the liquid dope is cast onto a substrate template that has a large area array of protrusions and/or pits, which can be fabricated on the substrate template by conventional micro-machining techniques. In various embodiments of the invention the large area array of protrusions and/or pits can be formed on the porous membrane by, for example: conventional micro-machining techniques; laser ablation, with or without employment of an array of microlenses to permit simultaneous parallel feature formation; photolithography followed by chemical etching; or masking and reactive ion etching.

Figure 1B:
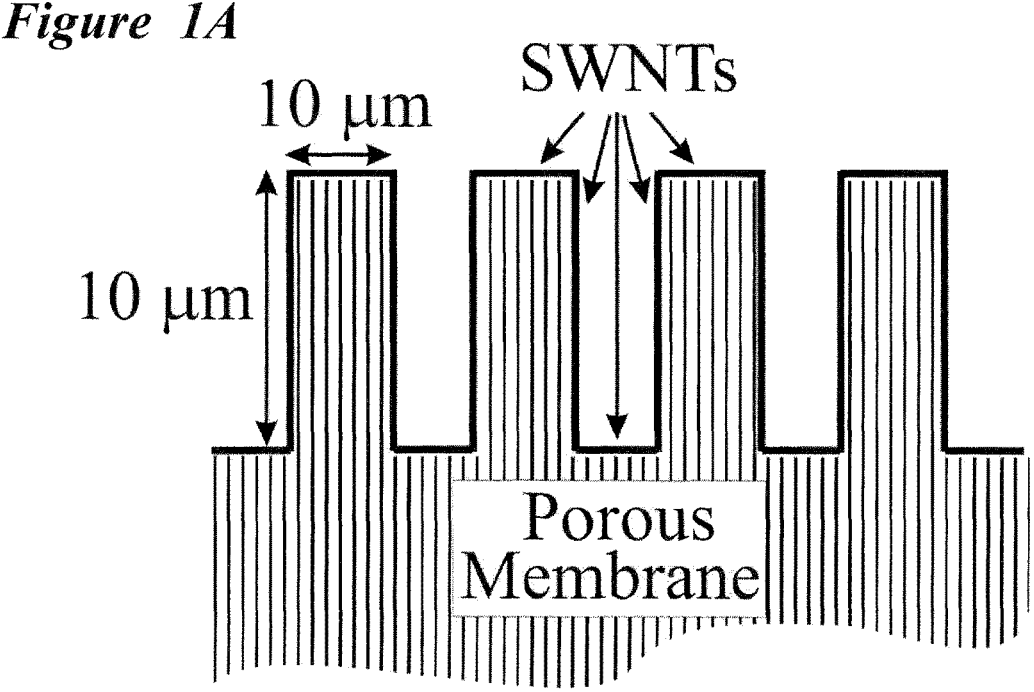

For example, the surface of a porous membrane can be patterned as an array of micro-machined square pillars as illustrated in cross section in FIG. 1a, where the square pillars are arrayed in a checker board pattern. The pillars can be very small in dimensions although the pillar dimensions are generally large relative to the pore size such that the pattern can be formed without affecting the porosity of the membrane or loss of mechanical integrity of the porous membrane. For example a porous membrane where pores are 0.22 μm micro-machined as in FIG. 1a with 10 μm×10 μm pillars that extend 10 μm from a base surface allows the deposition of a SWNT film that continuously conforms to all faces of the pillars. The additional surface area contributed by the side-walls of the pillars in the membrane results in an increase of surface area that is greater than the flat membrane surface before micromachining by a factor of three. Such a micro-machining has the potential to increase the current density of the air cathode by an equivalent factor of three. For example, by extending the height of the 10 μm×10 μm pillars on the membrane to 40 μm as illustrated in cross-section in FIG. 1b increases the surface area over which the SWNT films can conform by a factor of nine relative to the planar surface micro-machined to result in the topography. Again the current density can increase by approximately the same factor of nine.

As can be appreciated by one skilled in the art, other regular, random or quasi-regular, where a portion of a regular pattern is irregularly patterned or at a gross dimension the pattern is regular but at a smaller dimension it is irregular, topographies can be employed according to embodiments of the invention. Topological patterns of the membrane should be designed with consideration of the effect of the design on the flow rates of a fluid used to deposit the SWNT films through the various portions of the membrane, as significantly different flow can result in a non-uniform distribution of the SWNTs over portions of the film, which can be detrimental to the functioning of the air cathode. Design of an optimized patterned surface can consider physical limits relative to the expected surface area gained from patterning, and various combinations of modeling and experimentation would generally be necessary to identify the optimized pattern for a given membrane material.

A patterned membrane can also be formed by a process involving deposition and fusion of porous hydrophobic particles onto a porous membrane where, for example, fusing can be performed by a vapor phase solvent exposure or a controlled step of fusing the particles and membrane by heating under pressure. Again one can manipulate the porous particle sizes, their concentration and manner of deposition, such that the relative dimension of the particles and the spacing between the particles not only maximize the assembled SWNT film's surface area but optimizes the flow of a SWNT dispersion into the spacing to maintain a desired conductivity and connectivity of the SWNT film.

In some embodiments of the invention the SWNT film includes one or more second particulate materials that boost the oxygen reduction capacity of the SWNT film. The second material can be co-deposited with the SWNTs or it can be deposited onto a previously deposited SWNT surface to form the second material comprising film. Second materials for air cathodes according to embodiments of the invention include metals, metal alloys and metal oxides particles, for example Fe, Co, Ni, Ru, Pt, Pt—Ru alloys, $Mo_xRu_ySe_z$ alloys, $Mo_xRu_yTe_z$ alloys, $Ni_xMo_yTe_z$ alloys, $MnO_x$, $NiO_x$, $CoO_x$, $RuO_x$. Use of these catalysts associated with the SWNT films increases the current. In another embodiment of the invention, fullerenes ($C_{60}$, $C_{70}$, or larger) or fullerene derivatives, such as [6,6]-phenyl-$C_{61}$-butyric acid methyl ester, can be deposited onto a SWNT film from solvent or by thermal evaporation techniques followed by a heat treatment to promote distribution of the fullerenes into the SWNT film. In another embodiment of the invention, a plurality of a small molecule polycyclic aromatic compound, such as pyrene, benzopyrene, anthracene, chrysene, coronene, naphthacene, pentacene, perylene or their derivatives, such as those containing pyridinic nitrogen, quinones and pyrone, can be deposited separately or in combination on a deposited SWNT film to increase the film's oxygen reduction activity upon chemical and/or electrochemical treatment. The SWNT film provides the electrode through which electrochemically activated catalytic sites are formed.

In another embodiment of the invention, so called "sticky foot" polymers, as described in PCT Patent Application publication WO2008046010 and incorporated herein by reference, is included with the SWNT film to assemble conjugated and/or electrically conducting polymers within the air cathode. Such sticky foot polymers promote attachment as, to a first approximation, a monolayer to the surface of the SWNTs with a high binding energy. The conjugated polymer backbone provides additional binding sites to which oxygen reducing centers can be attached. Such sticky foot polymers can be functionalized, for example, with a variety of ligands that have a high binding affinity for organometallic reduction catalysts and/or metal nanoparticles. Exemplary ligands include thiols, terpyridyl, bipyridyl, salen, N-heterocyclic carbenes, cyclopentadienyl, cyclooctadiene, bis(diphenylphosphino)alkylenes, and porphryns. The ligand can be bound to a metal center or metal nanoparticle before or after adsorption of the sticky polymer to the SWNT film. In other embodiments of the invention, the sticky foot polymers may be functionalized with other oxygen reduction enhancing moieties to be included with the SWNT film. These moieties include: fullerenes, such as $C_{60}$, $C_{70}$; other carbon nanoparticles, such as nanohorns and graphene sheets; and conjugated polymers and oligomers. In other embodiments of the invention, sticky foot polymers may be functionalized to modify the hydrophobicity of the SWNT films to adjust the films surface properties to improve properties of the film, for example, ion transport and gas diffusion. Functionalized sticky foot polymers, for example can have pendant substituents such as perfluoroalkyl chains, ethylene oxide chains, alkyl chains, siloxane chains or combinations thereof to increase or decrease the hydrophobicity of the SWNT film's surface.

Methods and Materials

Figure 2:
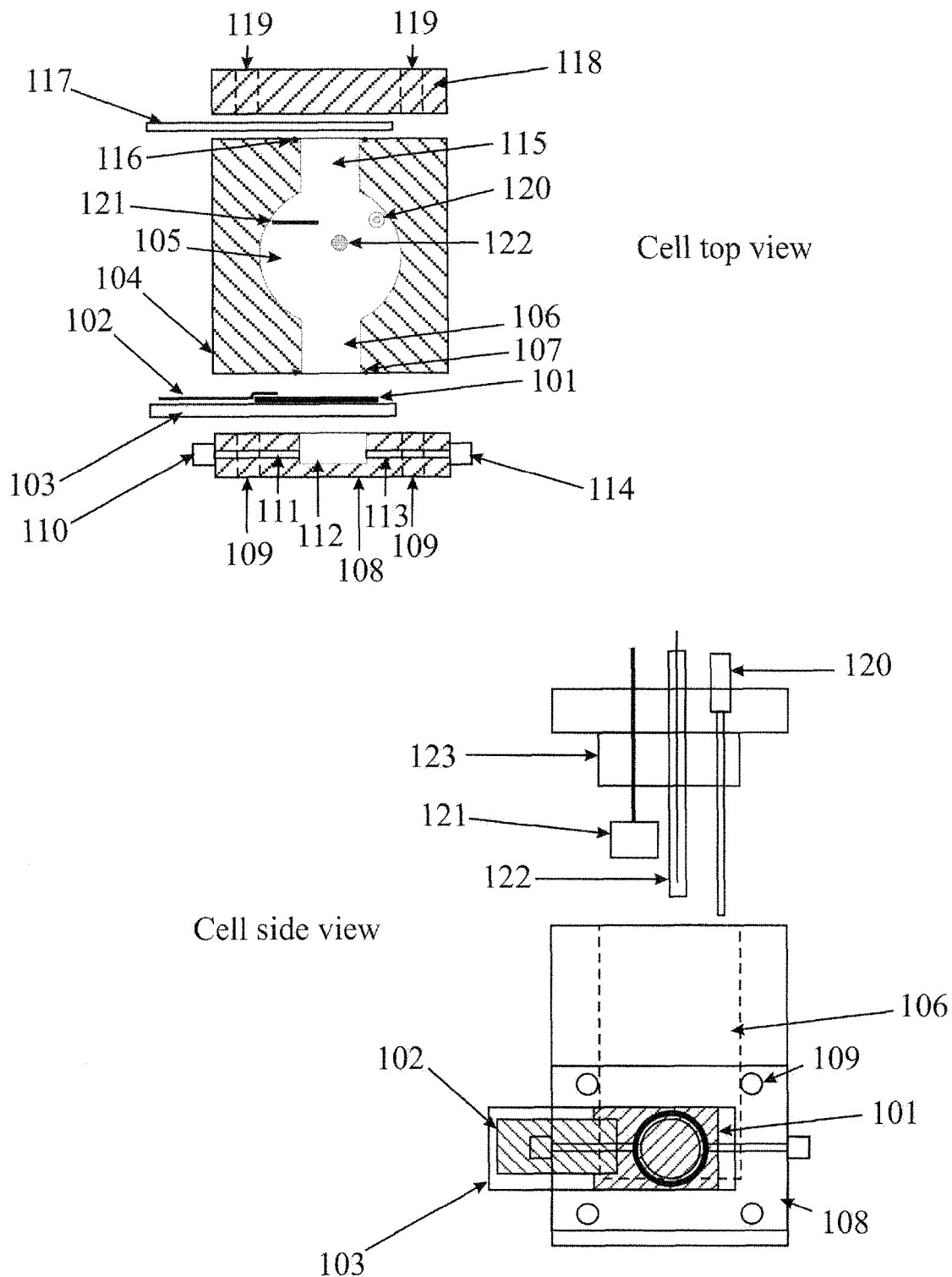
FIG. 2 shows the top and side views of a cell for testing the oxygen reduction capacity of the air cathodes in accordance with embodiments of the invention.

FIG. 2 illustrates a cross section of a metal electrode contacted SWNT film on a porous membrane and a cell that was used to test the electrochemical performance of the air cathode. The air cathode has a SWNT film 101, a contact electrode 102 and an underlying porous hydrophobic membrane 103. The cell body 104 was fabricated from solid PTFE. An opening through the cell sidewall 106 accesses the volume 105 for electrolyte in the cell. An O-ring 107 surrounds the sidewall opening 106 in the cell and forms a leak free seal against the SWNT film 101 when the membrane 103 supporting the SWNT film 101 and electrode 102 are pressed up against the O-ring 107 by the gas flow cover 108, which was fabricated from plexiglass. In a permanent cell the O-ring 107 could be replaced with a crimp seal, epoxy cement, adhesive or curing sealant. The gas flow cover 108 was secured to the cell body by four screws (not shown) placed through four holes 109 in the gas flow cover 108. The gas flow cover 108 has a gas inlet fitting 110, a through hole 111 to the gas chamber 112, followed by a through hole 113 to the gas outlet fitting 114. The cell body 104 is symmetric having a second sidewall opening 115 with a second O-ring 116. In a metal-air battery configuration, a metal foil 117 was placed across the second sidewall hole 115 in the cell sealing against the O-ring 116 by pressure from the blank cover 118. The blank cover 118 was secured to the cell body by four screws (not shown) that go through four holes 119 in the blank cover (two indicated). An electrolyte gas purge tube 120 (and fitting) goes through a top cover 123. A platinum flag counter electrode 121 represents (and a connecting wire) and a Ag/AgCl reference electrode 122 was used for the three terminal chronoamperometric measurements.

Figure 3:
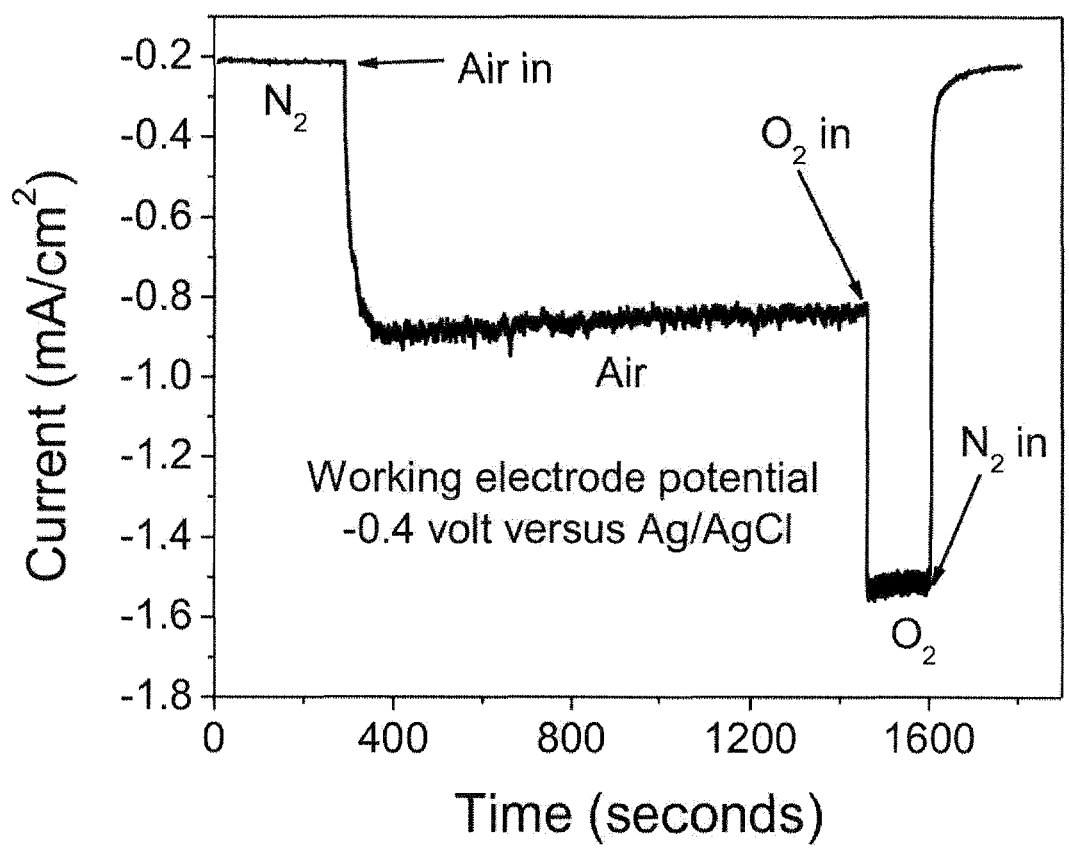
FIG. 3 shows chrono-amperometry on an air cathode in accordance with embodiments of the subject invention.

FIG. 3 shows the result of a three terminal chronoamperometry measurement of an air cathode using a cell with the structure illustrated in FIG. 2. The air cathode comprised a 120 nm thick SWNT film deposited on a Nylon membrane with 0.22 μm pores with Pd sputtered on a portion of the air cathode isolated from the electrolyte to make an external electrical connection. Measurements were made using a 0.1 M pH 13 phosphate buffer with the potential held at −0.4 V versus a Ag/AgCl reference electrode while the membrane side of the air cathode assembly was exposed to the gasses indicated in FIG. 3. The graph shows the rapid, stable and reversible working of the air cathode as it was cycled through exposure to $N_2$, air, pure $O_2$ and back to $N_2$. Similar experiments where the air cathode was exposed to air, then carbon monoxide (50-100%) for a period of minutes and then again exposed to air showed no degradation in the current due to CO exposure (data not shown).

Figure 4:
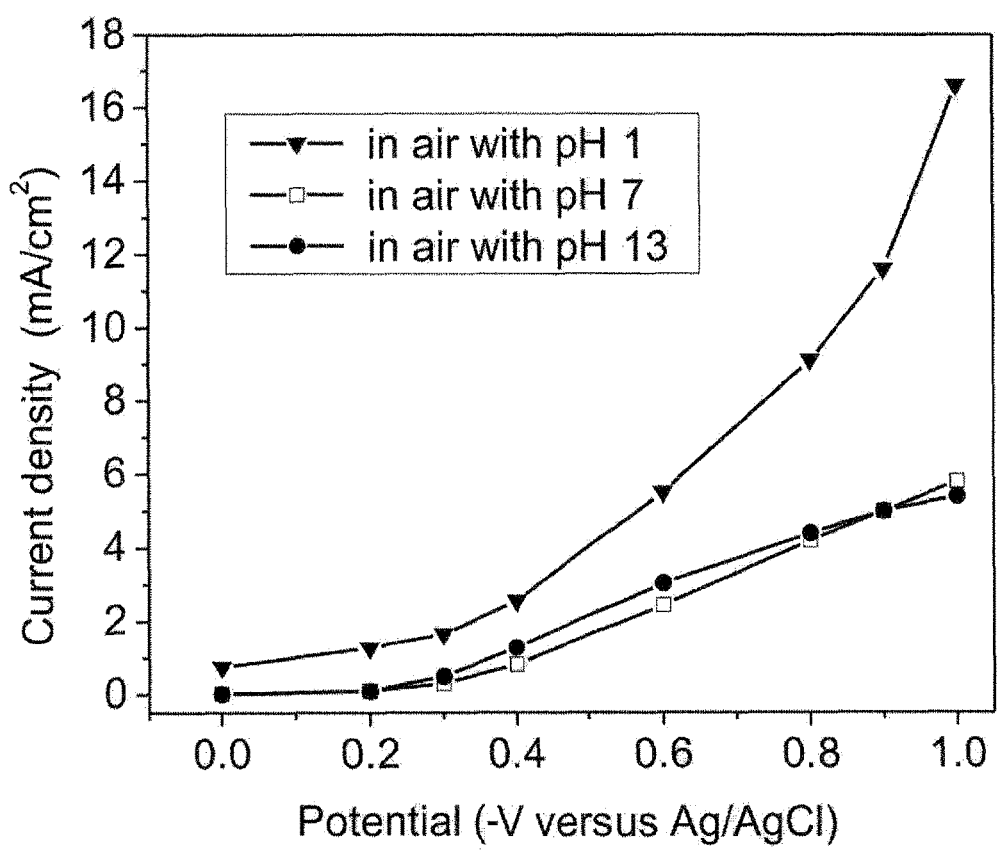
FIG. 4 shows current density versus applied potential at the pH indicated in accordance with embodiments of the invention, FIG. 5 show two terminal cell currents and potentials under increasing loads for the air cathodes in metal-air batteries for metal anodes comprising a) Al with an NaCl electrolyte, b) Mg with an NaCl electrolyte, c) Zn with an NaOH electrolyte and d) Zn with a $H_2SO_4$ electrolyte as indicated in accordance with embodiments of the subject invention.
Figure 5A:
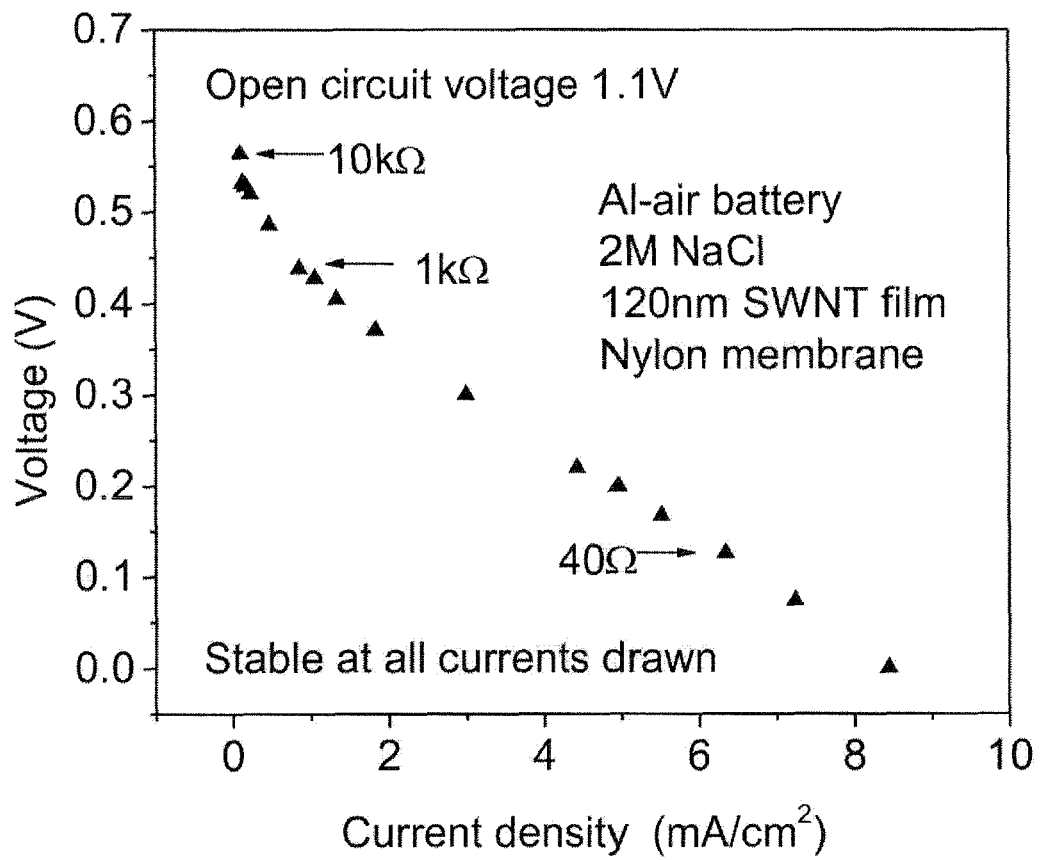
Figure 5B:
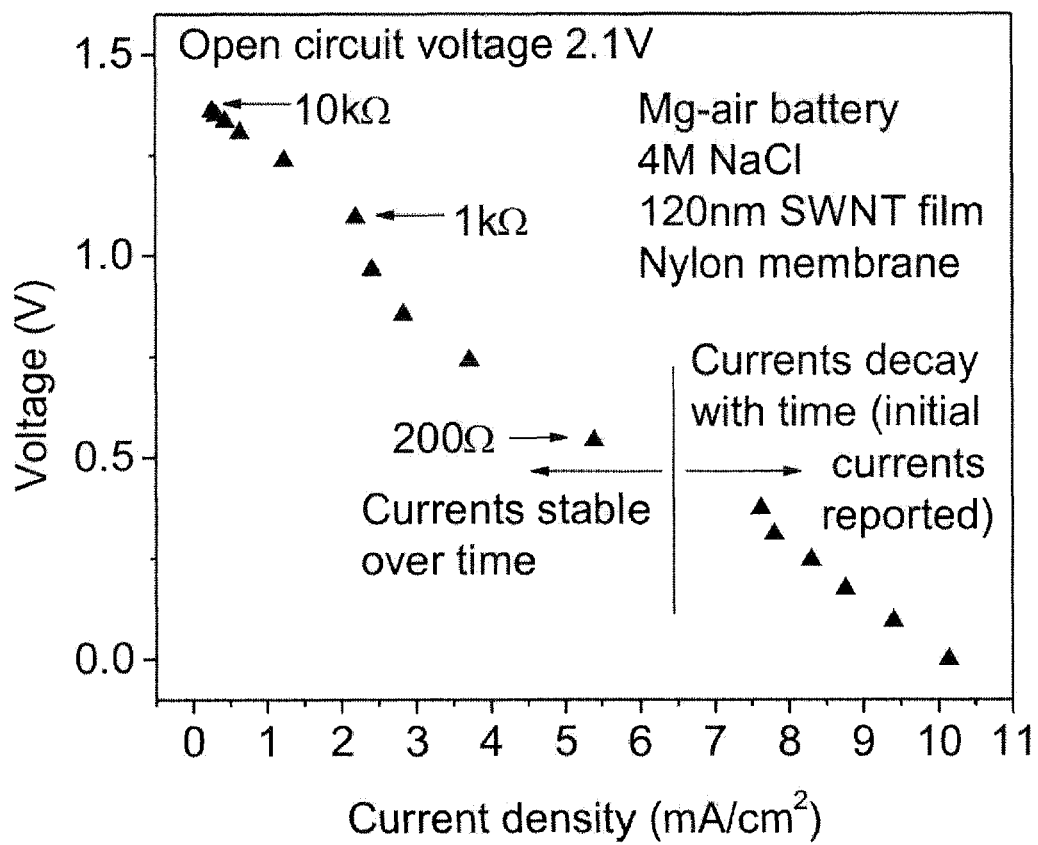
Figure 5C:
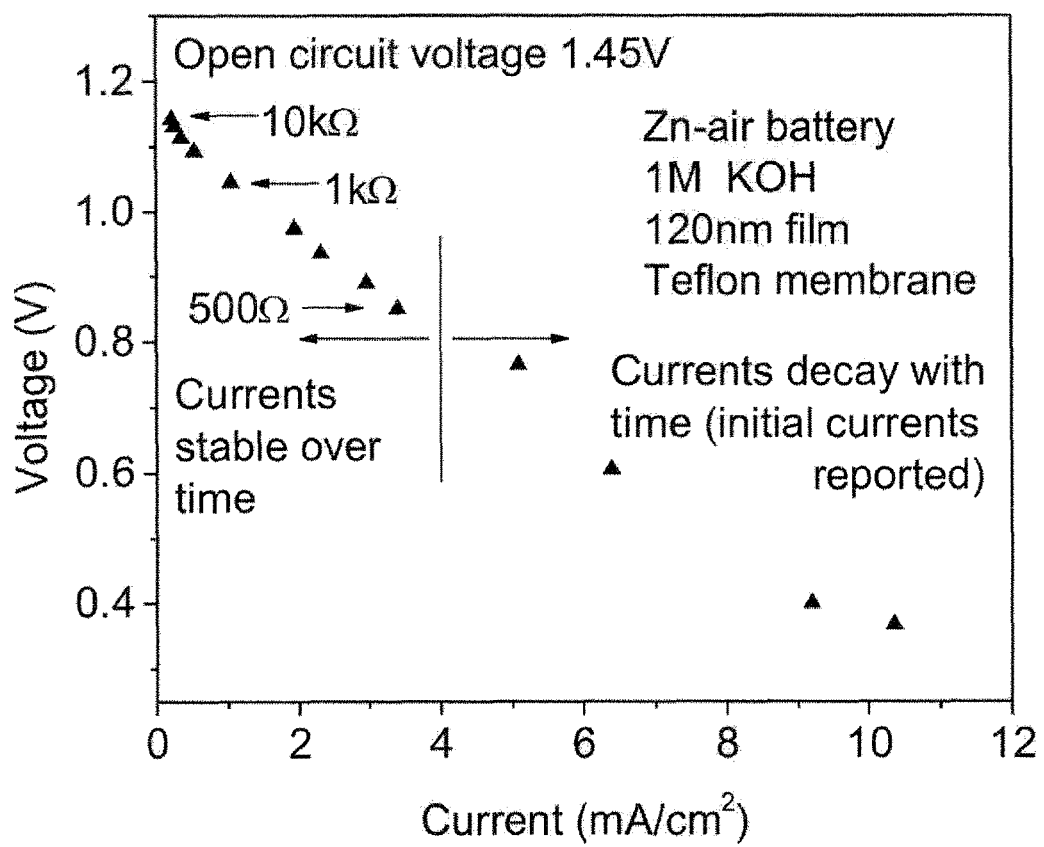
Figure 5D:
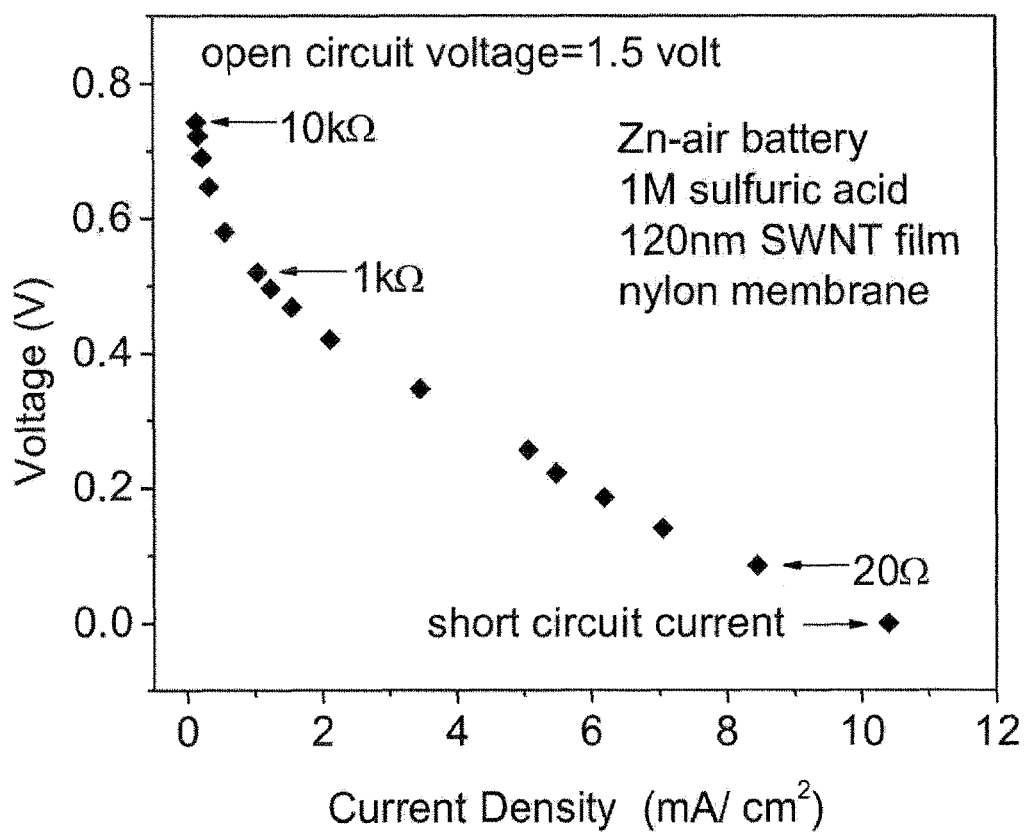

The plots in FIG. 4 illustrate the current densities attained by the air cathode described above for different electrolyte pH levels with air as the $O_2$ source. The pH 1 electrolyte was a 1 M sulfuric acid solution, the pH 7 electrolyte was a 0.1 M phosphate buffer and the pH 13 electrolyte was also a 0.1 M phosphate buffer. The connected data points reflect the steady state current density attained at each applied potential in three terminal measurements versus an Ag/AgCl reference electrode.

The performance of an air cathode according to an embodiment of the invention in metal-air battery cells was tested for the metals aluminum, magnesium, and zinc with a variety of electrolytes. The terminals of the cell being tested were connected to a variable resistor through an ammeter to measure the cell potential and the current under different loads. FIGS. 5a-d show the results of these measurements.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

The invention claimed is:

1. An electrochemical cell, comprising:
a liquid electrolyte;
an air cathode, wherein the air cathode comprises:
a porous membrane having at least one hydrophobic surface; and
a conductive catalytic film comprising single walled carbon nanotubes (SWNTs) having intimate electrical contact between said SWNTs, wherein said film contacts said hydrophobic surface of said porous membrane and said film is configured to be in direct contact with the liquid electrolyte, wherein said film does not comprise a metal catalyst, and wherein the air cathode is connected to an external circuit via direct electrical contact to the SWNTs.

2. The electrochemical cell of claim 1, wherein said porous membrane comprises a hydrophobic polymer, ceramic, or glass.

3. The electrochemical cell of claim 2, wherein said hydrophobic polymer comprises polytetrafluoroethylene, polyvinylidene fluoride, polyethylene, polypropylene, any polyamide, any polysulfone, or a polyolefin with perfluoroalkyl side chains.

4. The electrochemical cell of claim 1, wherein said SWNTs are doped by a charge transfer or substitutional dopant.

5. The electrochemical cell of claim 4, wherein said dopant comprises a graphite intercalate.

6. The electrochemical cell of claim 4, wherein the substitutional dopant is boron or nitrogen.

7. The electrochemical cell of claim 1, wherein said film further comprises fullerenes or fullerene derivatives.

8. The electrochemical cell of claim 1, wherein said film further comprises a conjugated polymer.

9. The electrochemical cell of claim 1, wherein said porous membrane has a non-planer topography and wherein said film conforms to said topography.

10. The electrochemical cell of claim 1, wherein said SWNTs are in intimate physical contact.

11. The electrochemical cell of claim 1, further comprising a means for electrically connecting an external circuit to a portion of said film.

12. The electrochemical cell of claim 1, further comprising conductive carbon fibers having micron scale diameters.

13. A metal-air battery, comprising:
an air cathode according to claim 1; and
a metal comprising anode.

14. The electrochemical cell of claim 1, wherein:
the electrochemical cell comprises a fuel cell; and
fuel is oxidized at an anode.

15. The fuel cell of claim 14, wherein said fuel comprises hydrogen, a hydrocarbon, or an alcohol.

16. The air cathode of claim 1, wherein said air cathode is not susceptible to carbon monoxide poisoning.

17. The air cathode of claim 1, wherein said SWNTs are oriented with their long axis approximately parallel to said hydrophobic surface of said porous membrane.

18. The electrochemical cell of claim 1, further comprising:
a metal electrode in direct contact with the SWNTs and configured to electrically connect a portion of said film to the external circuit.

19. The electrochemical cell of claim 18, further comprising:
a seal pressed against said film, configured to form a boundary to the liquid electrolyte, and wherein:
the metal electrode is disposed outside the boundary of the seal.

20. A method of preparing an air cathode in an electrochemical cell, comprising:
providing a porous membrane having at least one hydrophobic surface;
depositing a suspension comprising a plurality of SWNTs by filtration through said porous membrane, wherein a uniform film of SWNTs conforms to the topography of said hydrophobic surface;
washing said film with a solvent wherein intimate electrical contact between SWNTs results in a conductive catalytic film, wherein said film does not comprise a metal catalyst;
connecting the air cathode to an external circuit by forming a direct electrical contact to the SWNTs;

and positioning said film in direct contact with a liquid electrolyte in the electrochemical cell.

21. The method of claim 20, further comprising a step of attaching a conductor to a portion of said film.

22. The method of claim 20, further comprising a step of depositing fullerenes, metal oxides particles, electroactive polymer, or any combination thereof on said film.

23. The method of claim 20, wherein said suspension further comprises fullerenes or fullerene derivatives, metal oxides particles, electroactive polymer, conductive carbon fibers having micron scale diameters or any combination thereof.

\* \* \* \* \*